United States Patent [19]

Hashimoto

[11] 3,955,206

[45] May 4, 1976

[54] SINGLE LENS REFLEX CAMERA FOR USE WITH A MINIATURE FILM CARTRIDGE

[75] Inventor: Teiji Hashimoto, Kawasaki, Japan

[73] Assignee: Canon Kabushiki Kaisha, Japan

[22] Filed: Nov. 7, 1973

[21] Appl. No.: 413,492

[30] Foreign Application Priority Data

Nov. 8, 1972   Japan............................ 47-111843

[52] U.S. Cl. .............................. 354/152; 354/245; 354/275

[51] Int. Cl.² .................... G03B 9/36; G03B 19/12

[58] Field of Search ....................... 354/152–158 354/224, 225, 230, 234, 235, 241 243, 245, 240, 275

[56] References Cited

UNITED STATES PATENTS

| | | |
|---|---|---|
| 2,016,058 | 10/1935 | Steiner................................ 354/152 |
| 2,400,483 | 5/1940 | Cameron ............................ 354/152 |
| 3,049,982 | 8/1962 | Kendall ............................... 354/234 |
| 3,062,102 | 11/1962 | Martin ...................... 354/155 X |
| 3,098,419 | 7/1963 | Deache .............................. 354/154 |
| 3,426,666 | 2/1969 | Nagoto ............................... 354/152 |
| 3,440,943 | 4/1969 | Sauer ............................. 354/241 X |
| 3,468,228 | 10/1969 | Rogers ........................... 354/234 X |
| 3,472,139 | 10/1969 | Bohm ................................. 354/153 |
| 3,608,456 | 9/1971 | Hauser ........................... 354/154 X |
| 3,628,436 | 12/1971 | Sato ................................... 354/156 |
| 3,683,776 | 10/1968 | Ono ................................... 354/154 |
| 3,690,235 | 9/1972 | Ainslie ........................... 354/275 X |
| 3,759,156 | 6/1972 | Kobori ................................ 354/48 |
| 3,879,743 | 4/1975 | Wick et al. ......................... 354/225 |

Primary Examiner—L. T. Hix
Assistant Examiner—E. M. O'Connor
Attorney, Agent, or Firm—McGlew and Tuttle

[57] ABSTRACT

A single lens reflex camera, for use with a miniature film cartridge, has a follower shutter blade located behind the taking lens and a reflecting mirror serving also as a leading shutter blade co-operating with the follower shutter blade, is mouned obliquely in the recessed portion between the two film chambers of a film cartridge located behind the follower shutter blade. A focusing plate is provided the path of light rays reflected by the reflecting mirror at a position which is conjugate with respect to the film plane of the cartridge.

11 Claims, 3 Drawing Figures

SINGLE LENS REFLEX CAMERA FOR USE WITH A MINIATURE FILM CARTRIDGE

BACKGROUND OF THE INVENTION

1. Field of the Invention

The present invention relates to a single lens reflex camera for use with a miniature film cartridge in which a cartridge such as a cartridge of Kodak 110 Type (Trade name), for example, may be loaded.

2. Description of the Prior Art

Heretofore, a focal plane shutter type camera and a lens shutter type camera have been proposed as a single lens reflex camera for use with a miniature film cartridge of the type having two interconnected film chambers projecting from one side to define a recessed portion therebetween. While the focal plane shutter type camera has advantages in that the taking lens thereof can be easily interchanged and the shutter mechanism can be designed freely without appreciable limitation, thereby affording appropriate accuracy, it is difficult to locate the drum shaft and the main spring shaft in the focal plane shutter mechanism at appropriate positions because of the film chambers of the film cartridge located at the opposite ends of the cartridge, when the focal plane shutter is used, so that a separate space is required in the camera for arranging the focal plane shutter mechanism therein, thereby resulting in a bulky size of the camera body. Thus, the principal object to make the camera compact can not be achieved. On the other hand, while the lens shutter camera presents no problem in making the camera compact, it has problems in that it is difficult to interchangeably mount the taking lens and the shutter mechanism can not be freely designed without limitations, thereby resulting in difficulties in accuracy.

SUMMARY OF THE INVENTION

The primary object of the present invention is to eliminate the above described disadvantages of the prior art and to make it possible to mount a focal plane shutter in a single lens reflex camera for use with a miniature film cartridge having a recessed portion between two film chambers, one at each end.

The second object of the present invention is to provide a single lens reflex camera for use with such a miniature film cartridge in which the optical path of the finder between the taking lens and the eyepiece is formed in a Z shape.

The third object of the present invention is to provide a single lens reflex camera for use with such a miniature film cartridge in which the reflecting mirror in a single lens reflex camera is used commonly as a leading shutter blade which co-operates with a follower shutter blade provided separately from the leading shutter blade, thereby achieving the actuation of the shutter.

The fourth object of the present invention is to actuate the shutter time control circuit of the single lens reflex camera of the type described above by means of the reflecting mirror thereof, and to control the actuation of the follower shutter blade by means of an electromagnet actuated by the output of the shutter time control circuit, thereby effecting the control of the shutter time.

The fifth object of the present invention is to effect the return movement of the reflecting mirror of the single lens reflex camera of the type described above in coupled relationship with the shifting movement of the follower shutter blade.

The sixth object of the present invention is to effect the return movement of the follower shutter blade in coupled relationship with the return movement of the reflecting mirror of the single lens reflex camera of the type described above.

DETAILED DESCRIPTION OF THE PREFERRED EMBODIMENT

Following is a description of an embodiment of the present invention given with reference to the accompanying drawings.

Figure 1:
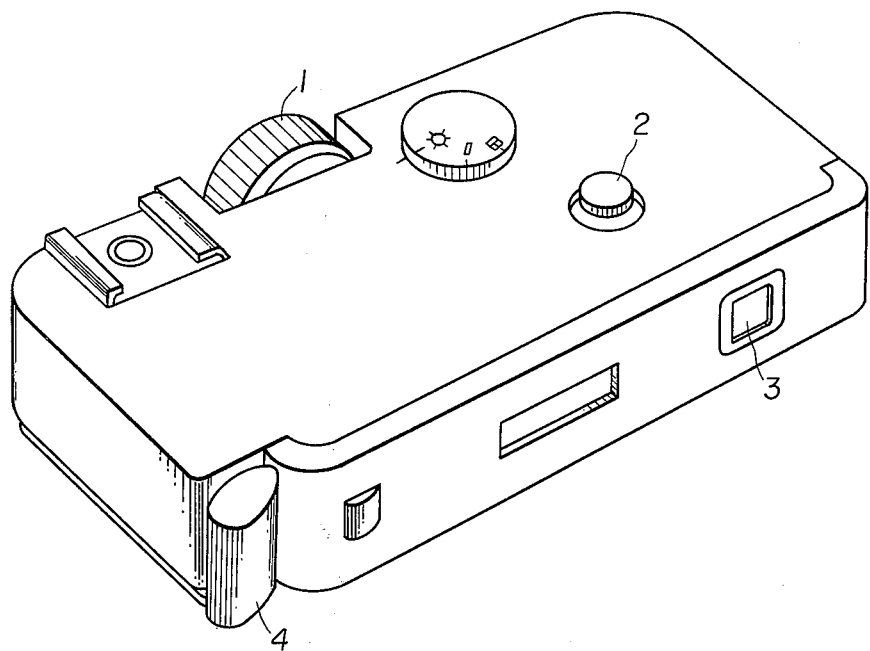
FIG. 1 is a general perspective view showing an embodiment of the camera in accordance with the present invention.

FIG. 1 shows a camera body, in which a taking lens 1 located substantially at the center of the front side wall of the body, a shutter button 2 located at the center adjacent one side edge of the upper wall of the body, an eyepiece 3 located at one end of the rear side wall of the body and a winding lever 4 located at the other end of the rear side wall of the body are arranged.

The internal construction of the camera arranged as described above will be described with reference to FIG. 2, wherein like parts as those shown in FIG. 1 are designated in FIG. 2 by the same reference numerals as those given in FIG. 1. The taking lens 1 comprises a front lens group 5 consisting in combination of three lens elements $5_1$, $5_2$ and $5_3$, for example, a rear lens group 6 similarly consisting in combination of three lens elements $6_1$, $6_2$ and $6_3$, and a diaphragm stop 7 interposed between the front lens group 5 and the rear lens group 6. A follower shutter blade 8 is arranged behind the taking lens 1, and a miniature film, cartridge 9 (a cartridge of Kodak 110 Type, for example), having a recessed portion therein between film chambers at each end thereof, is loaded behind the taking lens 1 with the photosensitive surface $9_1$ of the cartridge being positioned in the image forming plane of the taking lens 1. The follower shutter blade 8 includes a base plate $8_2$ having therein an opening $8_1$ adapted to pass therethrough the light rays from the taking lens 1 and a shiftable blade $8_3$ shiftably mounted on the base plate $8_2$ so as to open and close the opening $8_1$ in the base plate $8_2$. The shiftable blade $8_3$ has a projection $8_4$ at one end thereof with which an arresting lever 10 is normally engaged so that the opening $8_1$ is normally held in opened state. The arresting lever $10_1$ is urged in the anticlockwise direction by a spring (not shown), but it is disengaged from the projection $8_4$ by the attracting action of an electromagnet 10. The shifting movement of the shiftable blade $8_3$ along the base plate $8_2$ is effected by a follower shutter blade actuating mechanism 11, which comprises a closing lever 12, a return lever 13 for returning the shiftable blade $8_3$ and a transmitting lever 14 for transmitting the opening operation of the shiftable blade $8_3$. In other words, the shiftable blade $8_3$ engages with the free end of the closing lever 12 which is pivoted at the other end by a pivot shaft 15 so that the shiftable blade $8_3$ is shifted by the actuation of the lever 12. The closing lever 12 is energized in the clockwise direction by a spring 16 so as to normally urge the shiftable blade $8_3$ toward the position at which the opening $8_1$ is closed. One end of the return lever 13 is pivotally supported by the pivot shaft 15 of the closing lever 12 and the return lever 13 is urged by a spring 17 in the anticlockwise direction. A projection $13_1$ is formed in the return lever 13 at the central portion thereof and the projection $13_1$ is normally engaged with a projection $14_2$ formed at one end of the transmitting lever 14 which is pivoted at the central portion thereof by a pivot shaft $14_1$. The transmitting lever 14 is urged in the anticlockwise direction by a spring (not shown). The engagement of the transmitting lever 14 with the return lever 13 by the projections $13_1$ and $14_2$ is disengaged by the clockwise rotation of the transmitting lever 14 against the action of the spring so that the return lever 13 is rotated in the anticlockwise direction. Further the return lever 13 will engage and bias a projection $12_1$ provided at the central portion of the closing lever 12 when the return lever 13 is rotated in the anticlockwise direction. A reflecting mirror 18 is rotatably mounted in the recessed portion $9_2$ of the cartridge 9, a light intercepting plate (not shown) being provided in the recessed portion $9_2$ which permits only the light rays from the taking lens 1 to be incident upon reflecting mirror 18. The mirror 18 is allowed to rotate upwardly until it abuts against a cushioning stopper 19 made of elastomeric material (Maltopleue). Further, the mirror 18 is coupled with a normally closed start switch $S_2$ shown in FIG. 3 so that the switch $S_2$ is opened when the mirror 18 rotates upwardly while it is closed when the mirror 18 returns to its lower position. The start switch $S_2$ constitutes a switch of the shutter time control circuit shown in FIG. 3. The shutter time control circuit is actuated when the switch $S_2$ is opened so that the electromagnet 10 is actuated after the lapse of time corresponding to the output of the photoelectric element coupled with the above described diaphragm step 7. The reflecting mirror 18 is biased so as to be normally held in an oblique position abutting against the stopper 20 shown in FIG. 2, by a spring (not shown), so that the light rays from the taking lens 1 are reflected along the single dot chain line shown in FIG. 2. A focusing plate 21 and a condenser lens 22 are positioned in that order at a point, in the line of reflection of the light rays by the reflecting mirror 18, which is conjugate with the film plane of the cartridge 9 with respect to the reflecting mirror 18. The light transmitted through the condenser lens 22 is reflected in the direction $c$ which is parallel to the optical axis $a$ of the taking lens 1 by means of an optical system 23 provided in succeeding relation to the condenser lens 22 along the light path $b$, so that it is incident on the eyepiece 3 so as to be viewed therethrough. The optical system 23 consists of a front lens component 24 of the inverted image type, a mirror 25, a rear lens component 26 of the inverted image type, a condenser lens 27 and the eyepiece 3, and the positional relationship therebetween is as follows. That is, the mirror 25 is obliquely positioned at a point at which the mirror 25 reflects the light transmitted through the condenser lens 22 in the direction parallel to the optical axis of the taking lens 1. The front lens component 24, consisting in a combination of two lens elements $24_1$, $24_2$, is located adjacent to the light incident side of the mirror 25 and the rear lens component 26, consisting in a combination of two lens elements $26_1$, $26_2$, is located adjacent to the light reflecting side of the mirror 25, and the condenser lens 27 is located adjacent to the light entry side of the eyepiece 3. A frame member 28 is provided as a unit with the reflecting mirror, and a mirror actuating mechanism 29 is provided at one end of the frame member 28 for swinging the mirror 18 upwardly and returning it to the initial position. The mirror actuating mechanism 29 comprises a mirror raising lever 30, a mirror return lever 31, a start lever 32, and a locking mechanism 33 for locking the mirror return lever 31. In other words, one end of the frame member 28 of the mirror 18 is pivotally supported at about the center of one arm of the mirror raising lever 30 which latter is pivotally supported at about its center by a pivot shaft 34. The outer end of such one arm of the mirror raising lever 30 is adapted to abut against and bias a pin $28_1$ provided in the frame member 28 when the lever 30 is rotated in the clockwise direction so that the mirror 18 is rotated upwardly, while the left outer end of the lever 30 abuts against and biases the transmitting lever 14, for opening the shiftable blade $8_3$ of the follower shutter blade 8, in the clockwise direction when the lever 30 is rotated in the anticlockwise direction. The anticlockwise rotation of the lever 30 is limited by a stopper 35 shown in FIG. 2. One end of the return lever 31 for returning the mirror 18 is pivotally supported by the pivot shaft 34 of the mirror raising lever 30. A spring 36 is secured at its opposite ends to the central portion of the return lever 31 and to the left outer end of the mirror raising lever 30, respectively, so that the levers 31 and 30 are normally urged toward each other. The other end of return lever 31 is arrested by locking mechanism 33. Further, a spring 37 is attached to the return lever 31 so as to normally bias the same in the anticlockwise direction. A projection $31_1$ is provided in the return lever 31 adjacent to the lower end thereof. The projection $31_1$ is adapted to move the mirror raising lever 30 in the anticlockwise direction when the return lever 31 is rotated in the anticlockwise direction. The locking mechanism 33 comprises a locking lever 38 and an actuating lever 39 for actuating the locking lever 38, the locking lever 38 being pivotally supported by a pivot shaft $38_1$ with the projection $38_2$ formed at the outer end of one arm of the lever 38 releasably arresting the return lever 31. The locking lever 38 is biased in the anticlockwise direction by a spring 40 connected thereto, and, when the lever 38 is rotated in the clockwise direction against the action of the spring 40, the projection $38_2$ is disengaged from the return lever 31. The outer end of the other arm of the locking lever 38 is pivotally connected to one end of the actuating lever 39. The other end of the actuating lever 39 is movably supported on the base plate $8_1$ of the follower shutter blade 8, and it is moved to the right by the closing action of the shiftable plate $8_3$ so that the locking lever 38 is rotated in the clockwise direction. The right end of the mirror raising lever 30 is normally arrested by a projection $32_2$ provided at one end of the start lever 32 which is pivotally supported at its central portion by a pivot shaft $32_1$. The start lever 32 is biased in the clockwise direction by a spring 41 connected to the lever 32 and, when the lever 32 is rotated in the anticlockwise direction against the action of the spring 41, the projection $32_2$ is disengaged from the mirror raising lever 30. The start lever 32 is adapted to be rotated in the anticlockwise direction by depressing of the shutter button 2 which has a tapered surface engaging lever 32. The shutter button 2, in addition to the above described actuation of the start lever 32 in the anticlockwise direction upon depression of the button 2, serves also as a switch $S_1$ of a D.C. electric source 42 in FIG. 3, so that the switch $S_1$ is closed by the depression of the shutter button 2 while the switch $S_1$ is opened when the shutter button 2 is released. The film winding lever 4 is adapted to actuate the film winding mechanism 43 and the shutter charging mechanism 44 for the rotation thereof. That is, a first gear 46 coupled unit unitarily with the lever 4 for rotation therewith, is secured to the rotary shaft 45 of the film winding lever 1. The first gear 46 meshes with a second gear 47. A third gear 48 is secured to the shaft to which the second gear 47 is attached so that the third gear 48 is rotated together with the second gear 47. The film winding gear $9_3$ of the cartridge 9 meshes with the third gear 48. A pin $4_1$ is provided at the end of the film winding lever 4 adjacent to the rotary shaft 45. The pin $4_1$ is adapted to abut against the side of a transmitting rod 49 which is pivotally supported at one end thereof by a pivot shaft $49_1$. The transmitting rod 49 is biased in the clockwise direction by a spring (not shown), and the rod 49 is rotated in the anticlockwise direction against the bias of the spring by the clockwise rotation of the film winding lever 4 by the abutment of the pin $4_1$ against the rod 49. One end of a charging bar 50 is rotatably connected to the other end of the transmitting rod 49.

An elongated slot $50_1$ is formed adjacent the other end of the charging bar 50, and the pivot shaft $32_1$ of the start lever 32 is slidably engaged in the elongated slot $50_1$. A charging pin $50_2$, for charging the return lever 13 for the shiftable blade $8_3$, and a pin $50_3$, for actuating the mirror return lever 31, are secured to the charging bar 50 at positions spaced from each other as required for the operation. The charging bar 50 is moved in the direction as indicated by the arrow A in FIG. 2 by the anticlockwise rotation of the transmitting lever 49 so that the return lever 13 for the shiftable blade $8_3$ and the return lever 31 for the reflecting mirror 18 are engaged with the transmitting lever 14 and the locking lever 38 by means of the pins $50_2$ and $50_3$, respectively.

Figure 3:
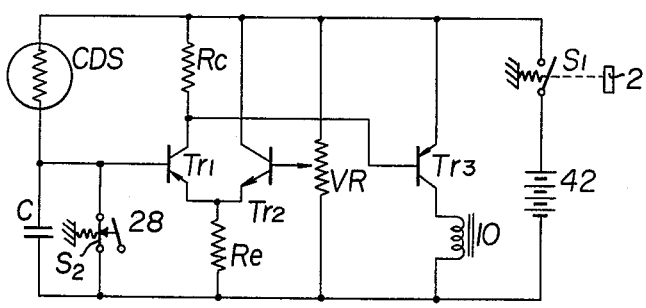
FIG. 3 is a schematic wiring diagram showing the shutter time control circuit used in the camera shown in FIG. 2.
Figure 2:
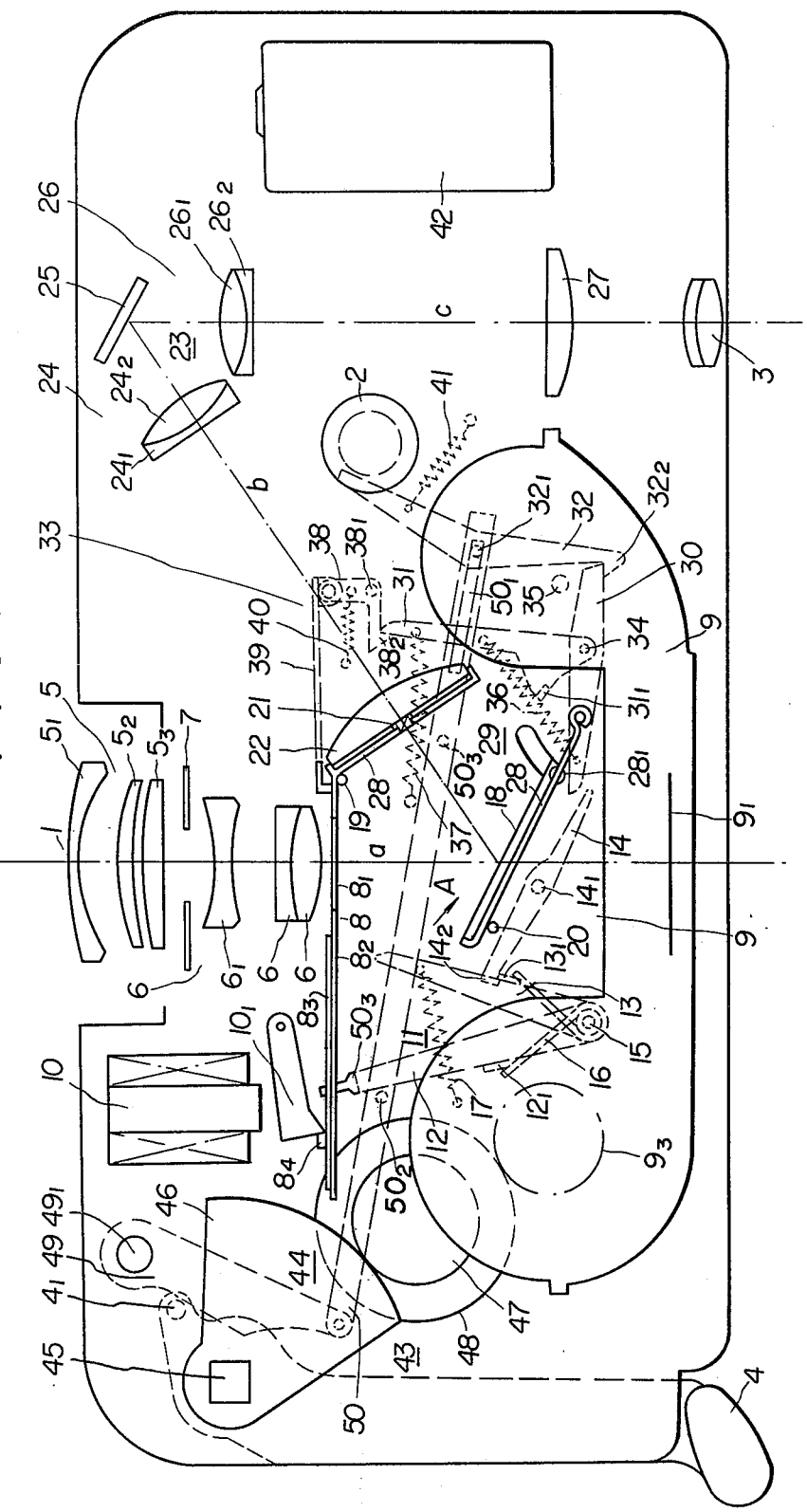
FIG. 2 is an elevational view with the cover of the camera removed for illustrating the internal construction of the camera shown in FIG. 1.

FIG. 3 shows the well known shutter time control circuit to be used in the camera shown in FIG. 2. The control circuit includes the electric source 42, the normally opened switch $S_1$ constituted by the shutter button 2 as previously described, and a pair of transistors $Tr_1$ and $Tr_2$, of the same performance characteristics, forming a differential amplifier. The emitters of transistors $Tr_1$ and $Tr_2$ are connected to a common emitter resistor Re, the collector of the transistor $Tr_1$ being connected to a collector resistor Rc. The first input for such a differential amplifier is provided by a series circuit consisting of a photoelectric element CdS the resistance value of which varies corresponding to the brightness of the scene to be taken as well as the value of the diaphragm opening of the taking lens and a capacitor C for the charging, with the charged voltage of the capacitor C being used as the first input. The normally closed start switch $S_2$ is connected in parallel to the capacitor C. The second input side of the differential amplifier is connected to the adjustable contact or tap of a variable resistor $V_R$ for setting the film sensitivity. The transistor $Tr_3$ serves as an amplifying transistor, the collector of the transistor $Tr_3$ being connected to the electromagnet 10, while the base is connectecd to the collector of the transistor $Tr_1$.

The operation of the device as constructed as above will be described below. Under the normal condition in which the shutter button 2 is not depressed, i.e., under the condition as shown in the figures, the light rays from the taking lens 1 are reflected by the reflecting mirror 18 and, thereafter, transmitted through the focusing plate 21, condenser lens 22 and the front lens component 24 in that order, and again reflected by the mirror 25 and transmitted through the rear lens component 26 and the condenser lens 27 in that order to reach eyepiece 3 as shown by the Z-shaped chain line, thereby permitting the scene or object to be viewed by the photographer.

Under such a condition, when the shutter button 2 is depressed, the switch $S_1$ of the electric source 42 is closed, while the start lever 32 is rotated in the anticlockwise direction. Thus, the projecting $32_2$ of the start lever 32 is disengaged from the mirror raising lever 30 thereby allowing lever 30 to be rotated in the clockwise direction by the action of the spring 36. Therefore, the left outer end of lever 30 abuts against the pin $28_1$ of the reflecting mirror 18 and urges the mirror 18 for upward rotation until it is stopped by the cushioning stopper 19. By the upward rotation of the mirror 18, the light rays from the taking lens 1 commence the exposure of the photosensitive surface $9_1$ of the film in the cartridge 9 instead of being reflected by the mirror 18. At the same time, by the upward rotation of the mirror 18, the start switch $S_2$ is opened. Therefore, the shutter time control circuit is activated so that the electromagnet 10 is actuated after the lapse of time corresponding to the output of the photoelectric element CdS serving as the light receiving element coupled with the diaphragm opening 7. In other words, transistor $Tr_2$ is supplied with the base voltage by the closure of the switch $S_1$ caused by the depression of the shutter button 2. Then, when the start switch $S_2$ is opened by the upward movement of the mirror 18, the capacitor C commences to be charged by the current flowing through the photoelectric element CdS. When the charged voltage of the capacitor C rises and becomes equal to the base voltage of the transistor $Tr_2$, the collector current of the transistor $Tr_1$ is greatly increased and amplified by the transistor $Tr_3$ so as to be applied to the electromagnet 10 thereby actuating the same. Thus, the arresting lever $10_1$ is attracted by the electromagnet 10, and the projection $8_4$ of the shiftable blade $8_3$ is disengaged from the arresting lever $10_1$, thereby permitting the shiftable blade $8_3$ to be shifted by the closing lever 12 so as to close the opening $8_1$. By the closure of the opening $8_1$, the exposure of the photosensitive surface $9_1$ of the cartridge 9 by the light rays from the taking lens 1 is terminated and, at the same time, the leading edge of the shiftable blade $8_3$ engages and shifts the actuating lever 39 of the locking mechanism 33. Therefore, the locking lever 38 is rotated in the clockwise direction disengaging the return lever 31 therefrom. Thus, the return lever 31 is rotated in the anticlockwise direction by the action of the spring 37. At the same time, the mirror raising lever 30 is also engaged by the projection $31_1$ of the return lever 31 to rotate in the anticlockwise direction until arrested by the stopper 35. Thus, the reflecting mirror 18 is rotated by the action of the spring 36 in the anticlockwise direction to follow the movement of the lever 30 until arrested by the stopper 20 in the initial position. By the return movement of the mirror 18, the switch S2 is closed to deenergize the electromagnet 10 thereby releasing the arresting lever $10_1$ so as to ride on and be urged against the base plate $8_2$ of the follow shutter blade 8. At the end of the rotation of the lever 30, one end of lever 30 abuts against and urges the other end of the transmitting lever 14 for transmitting the releasing action of the shiftable blade $8_3$, so that the transmitting lever 14 rotates in the clockwise direction to disengage the return lever 13 for returning the shiftable blade $8_3$. Thus, the return lever 13 is rotated in the anticlockwise direction by the action of the spring 17. At the same time, the projection $12_1$ of the closing lever 12 engages the side of the return lever 13 so that the closing lever 12 is rotated in the anticlockwise direction. Therefore, the shiftable blade $8_3$ is shifted to open the opening $8_1$ of the base plate $8_2$, while the projection $8_4$ of the shiftable blade $8_3$ is engaged with and arrested by the arresting lever $10_1$.

As described above, since the opening $8_1$ of the base plate $8_2$ is opened, the light rays from the taking lens 1 proceed again along the optical path indicated by the chain line in FIG. 2, so that the light rays are viewed through the eyepiece 3. Under such a condition, when the shutter button 2 is released, the start lever 32 is returned to the position as shown in FIG. 2 so as to engage and arrest the mirror up lever 30. When the film winding lever 4 is rotated in the clockwise direction, the film winding gear $9_3$ is rotated in the clockwise direction through the first, the second and the third gears 46, 47 and 48 so that the film in the cartridge 9 is fed a determined length. At the same time, the transmitting rod 49 is rotated in the anticlockwise direction so that the charging bar 50 is moved in the direction as indicated by the arrow A in FIG. 2, thereby causing the pins $50_2$ and $50_3$ of the charging bar 50 to rotate the return lever 13 for the shiftable blade $8_3$ and the return lever 31 for the mirror 18 in the clockwise direction. Thus, the return lever 13 for the shiftable blade $8_3$ is arrested by the transmitting lever 14 while the return lever 31 for the mirror 18 is arrested by the locking lever 38, so that the charging of the shutter is terminated. Thereafter, when the film winding lever 4 is rotated in the anticlockwise direction to restore its initial position as shown in FIG. 2, the charging bar 50 is moved in the reverse direction to that shown by the arrow A thereby restoring its initial position. Thus, all the elements of the camera are returned to their initial positions shown in FIG. 2 so as to be ready for the next operation of the camera.

In the embodiment described above, the mirror 25 of the optical system 23 is shown as being a plan mirror, but the mirror of the present invention is not intended to be limited to such a plain mirror but a penta-prism may be equally used.

Further, in the present invention, since the swingable reflecting mirror is commonly used as the leading shutter blade, the space between the reflecting mirror and the film plane must, of course, be formed as a dark box, i.e., a camera.

As described above in detail, in accordance with the present invention, the follower shutter blade is located behind the taking lens and the reflecting mirror, which serves also as the leading shutter blade co-operating with the follower shutter blade, is obliquely located in the recessed portion of the film cartridge located behind the follower shutter blade, the focusing plate being located at a position in the direction of reflection by the reflecting mirror conjugate with the film plane, the finder optical system being so arranged that the light transmitted through the focusing plate is reflected parallel to the optical axis of the taking lens, thereby permitting the recessed configuration of the miniature film cartridge to be most efficiently utilized for arranging the elements of the camera, so that the camera can be made very compact, while the interchanging of the taking lens is made very easy, and the design of the shutter can be made very easy, because the shutter is constructed as a type of focal plane shutter having a leading shutter curtain and a follower shutter curtain, thereby obtaining a high accuracy. Further, since the reflecting mirror is used also as the leading shutter blade or curtain, the present invention can provide a very useful single lens relfex camera for use with a miniature film cartridge in which the film winding mechanism and the shutter release mechanism thereof can be made very simple.

It will be clear from the foregoing description and from the drawings that the "miniature film cartridge" useable with the single lens reflex camera of the invention is of the well-known type having two film spool chambers interconnected, at one side of the cartridge, by a rectilinear bridge portion, one chamber being at each end of the bridge portion, and with the bridge portion and the two chambers defining a recess in the opposite side of the miniature film cartridge. Such a miniature film cartridge is mounted in a camera in such a position that the photosensitive surface of the film in the cartridge, such as indicated in FIG. 2 at $9_1$, is located in the image-forming plane of the taking or photographing lens of the camera, and with the two film spool chambers extending inwardly, relative to the bridge portion, when the miniature film cartridge is mounted in the camera.

What is claimed is:

1. Single reflex camera, for use with a miniature film cartridge of the type having two film spool chambers interconnected at one side of the cartridge by a bridge portion to define a recess in the opposite side of the cartridge, with the photosensitive surface of the film, when the cartridge is mounted in the camera, lying in the image-forming plane of the taking lens of the camera, said single lens reflex camera comprising, in combination, a taking lens defining an image-forming plane, a curtain type shutter movable across the optical path of light rays entering through said taking lens; a reflex mirror pivotally mounted in said camera at a position wherein when such a miniature cartridge is mounted in said camera, said reflex lens is disposed in such recess; said reflex mirror being biased to a first position in which it extends obliquely across the optical path of light rays entering through said taking lens for incidence upon said image-forming plane, and being pivotal to a second position, displacing from said optical path, to function as the sole leading shutter screen of said curtain type shutter; a trailing shutter screen positioned in said camera between said taking lens and said reflex mirror and shiftable between a retracted position in which it is displaced from said optical path and a light intercepting position in which it intersects said optical path and blocks the light rays, entering through said taking lens, from incidence upon said image-forming plane, said trailing shutter screen being normally displaced from said optical path; trailing shutter screen control means including shifting means operable to shift said trailing shutter screen to its light intercepting position and returning means operable to shift said trailing shutter screen to its retracted position; releasable latch means locking said returning means in an inoperative state; releasable blocking means blocking said trailing shutter screen in its retracted position and, when released, placing said shifting means in an operative state to shift said trailing shutter screen to its light intercepting position; shutter time control means operable to release said blocking means following the elapse of a predetermined length of time following pivotal movement of said reflex mirror to its second position; reflex mirror operation control means including a mirror raising means operable to rotate said reflex mirror to its second position and a mirror return means operable to rotate said mirror to its first position; said mirror return means, responsive to completion of the movement of said mirror to its first position, releasing said latch means to release said returning means of said trailing shutter screen for operation to return said trailer shutter screen to its retracted position; releasable locking means locking said mirror return means in an inoperative state; said last-named locking means being released by said trailing shutter screen responsive to movement thereof to to said light intercepting position; and release means operable to actuate said mirror raising means to move said mirror to its second position.

2. Camera according to claim 1, including a focusing plate positioned at a location in said camera in the path of light reflected by said reflex mirror in its first position and conjugate with said image-forming plane.

3. Camera according to claim 2, further comprising a condenser lens positioned behind said focusing plate in the direction of the light reflected by said reflex mirror in its first position.

4. Camera according to claim 3, including reflecting means reflecting the light passing through said condenser lens in a direction substantially parallel of said taking lens.

5. Camera according to claim 2, further comprising a finder optical system; said finder optical system including light reflecting means positioned in the path of light reflected by said reflex mirror in its first position and passing through said focusing plate; said light reflecting means directing the light-reflected by said reflex mirror through said focusing plate along a reflected light path parallel to the optical axis of said taking lens; and an eyepiece having its optical axis aligned with the reflected light path and parallel to the optical axis of said taking lens; whereby the path of light entering through said taking lens and reflected by said reflex mirror through said focusing plate to said light-reflecting means and then reflecting through said eyepiece is a Z-shape path.

6. Camera according to claim 5, wherein said light-reflecting means of said finder optical system is a mirror.

7. Camera according to claim 6, in which said finder optical system includes respective inverted image lens systems arranged at the light-receiving side and the light-reflecting side of said mirror of said finder optical system.

8. Camera according to claim 1, wherein said taking lens is provided with a diaphragm opening.

9. Camera according to claim 1, wherein said trailing shutter screen comprises a base plate having an opening transmitting therethrough the light from said taking lens and a shiftable blade slidably located on said base plate so as to open and close said opening.

10. Camera according to claim 1, in which said shutter-time control means includes an electromagnet operable, when energized, to release said blocking means which blocks said trailing shutter screen in its retracted position; and switch means operable to effect control of actuation of said shutter-time control means, said switch means being operatively associated with said reflex mirror and being closed thereby in the first position of said reflex mirror and released to open responsive to rotation of said reflex mirror to its second position; said switch means, when opened, initiating actuation of said shutter-time control means.

11. Camera according to claim 1, further including a film wind-up means operatively associated with said trailing shutter screen control means and said reflex mirror operation control means and operable, responsive to a film wind-up operation, to restore said trailing shutter screen control means and said mirror operation control means to a charged state for taking of a picture.

* * * * *